(No Model.)

A. DOM.
COOKING UTENSIL.

No. 549,503. Patented Nov. 12, 1895.

WITNESSES
W. C. Jirdinston.
Harry P. Koking.

INVENTOR
Alexander Dom
per O. M. Hill
ATTORNEY.

UNITED STATES PATENT OFFICE.

ALEXANDER DOM, OF MOUNT HEALTHY, ASSIGNOR TO FORSHEE & McMAKIN, OF CINCINNATI, OHIO.

COOKING UTENSIL.

SPECIFICATION forming part of Letters Patent No. 549,503, dated November 12, 1895.

Application filed March 10, 1893. Serial No. 465,414. (No model.)

*To all whom it may concern:*

Be it known that I, ALEXANDER DOM, a citizen of the United States, residing at Mount Healthy, Hamilton county, State of Ohio, have invented certain new and useful Improvements in Cooking Utensils, of which the following is a specification, reference being had to the accompanying drawings.

The nature and object of my invention will be fully apparent from the description and claim hereinafter set forth in detail.

Figure 1:
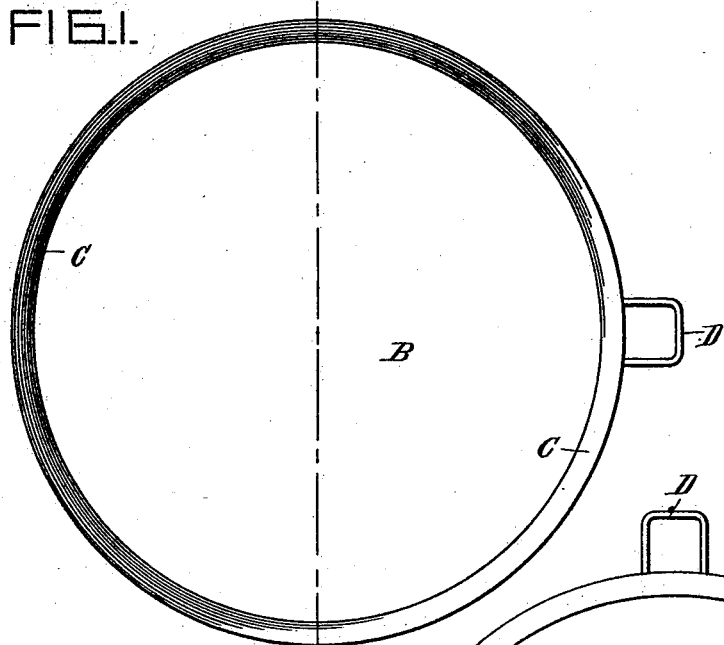
Figure 4:
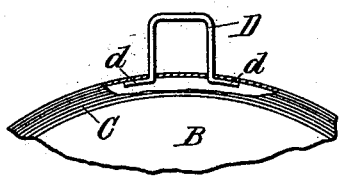
Figure 2:
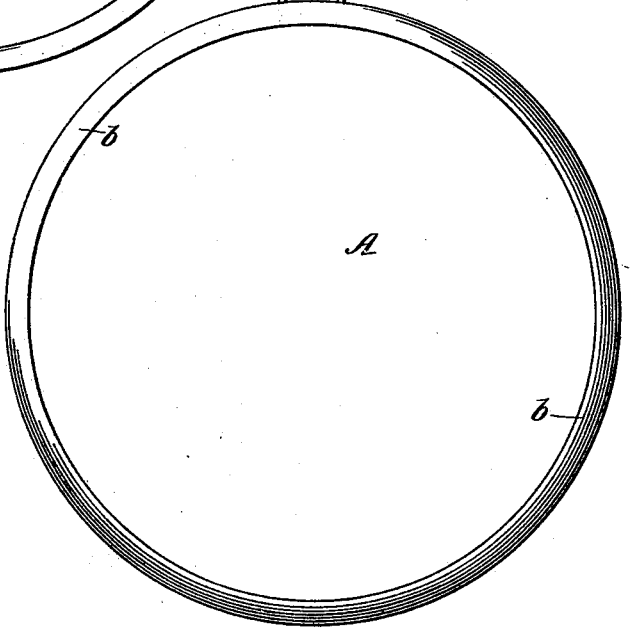
Figure 3:
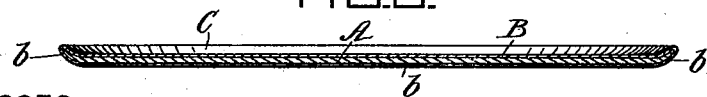

In the accompanying drawings, Figure 1 is a top or face view of a cooking utensil embodying my invention, and Fig. 2 is a bottom view of same. Fig. 3 is a diametrical section on dotted line 3 3 of Fig. 1. Fig. 4 is a detail sectional view illustrating one and the preferred mode of connecting the handle to the utensil.

My improved cooking utensil is preferably of a circular outline, as shown, but may be of any other suitable or desirable outline, and consists of a layer or sheet of asbestos A, having an outer or face covering of suitable metal B, which latter around its peripheral edge is made to overlap the asbestos, forming a crimping or clamping flange $b$ on the bottom thereof, as shown. This flange, in connection with the body portion of the metal face, affords a secure and comparatively rigid foundation or base for the sheet of asbestos.

The metal plate B is preferably flared upward around its edge at the overlapped portion, thus providing an upwardly-projecting peripheral flange C, for the purpose hereinafter set forth.

My improved cooking utensil is preferably provided with a handle D, which latter, when constructed as shown, consists of a wire bent upon itself, the end portions of which are inserted through openings formed in the metal plate at its creased or folded portion, after which the end portions of said wire are bent outward, forming the angles $d$, after which the flange $b$ is bent and compressed to place over and around the asbestos and upon said angular portions of the handle. This construction admits of said handle being rigidly connected to the utensil in a cheap and expeditious manner.

The principal advantage derived from the use of my invention is the facility afforded thereby for cooking various articles of food without danger of burning or charring same. The qualities of asbestos to retard the rapid radiation of heat are well known; but no provision has heretofore been made by which this non-combustible material could be expeditiously used for cooking purposes. The metal covering or face affords a surface for frying or poaching meats, eggs, &c., while the outer upturned flange C prevents the grease or other cooking liquid from running off onto the stove. If desired to toast bread or other articles, the utensil is turned upside down, with the metal exposed to the heat, when the material to be toasted is placed upon the asbestos.

It will thus be seen that the device itself is designed to be used as a cooking utensil, and, if so desired, it may be used to advantage in connection with other cooking utensils—*i. e.*, an article of food that would ordinarily require constant stirring to prevent scorching may be placed in a closed vessel, and then place the latter upon my improved cooking utensil, when the food will be slowly and thoroughly cooked without any stirring whatever and without danger of scorching.

I am aware that it is not new, broadly, to place a piece of asbestos beneath a cooking utensil; also that it is not new, broadly, to provide a piece of asbestos with a metal binding or covering; but

What I claim as new, and desire to secure by Letters Patent, is—

A reversible cooking utensil, consisting of a sheet of asbestos, and a plate of metal provided with an upturned flange $b$ inclosing the edge of the asbestos substantially as shown and described, the said flange operating to retain the hot fat in the utensil during one cooking operation and preserving an air space between the said plate of metal and the stove, when the utensil is reversed, during another cooking operation which requires less heat.

ALEXANDER DOM.

Witnesses:
 HARRY F. KOKING,
 O. M. HILL.